(No Model.)
G. C. HALE.
HORSE COLLAR.
No. 452,928. Patented May 26, 1891.
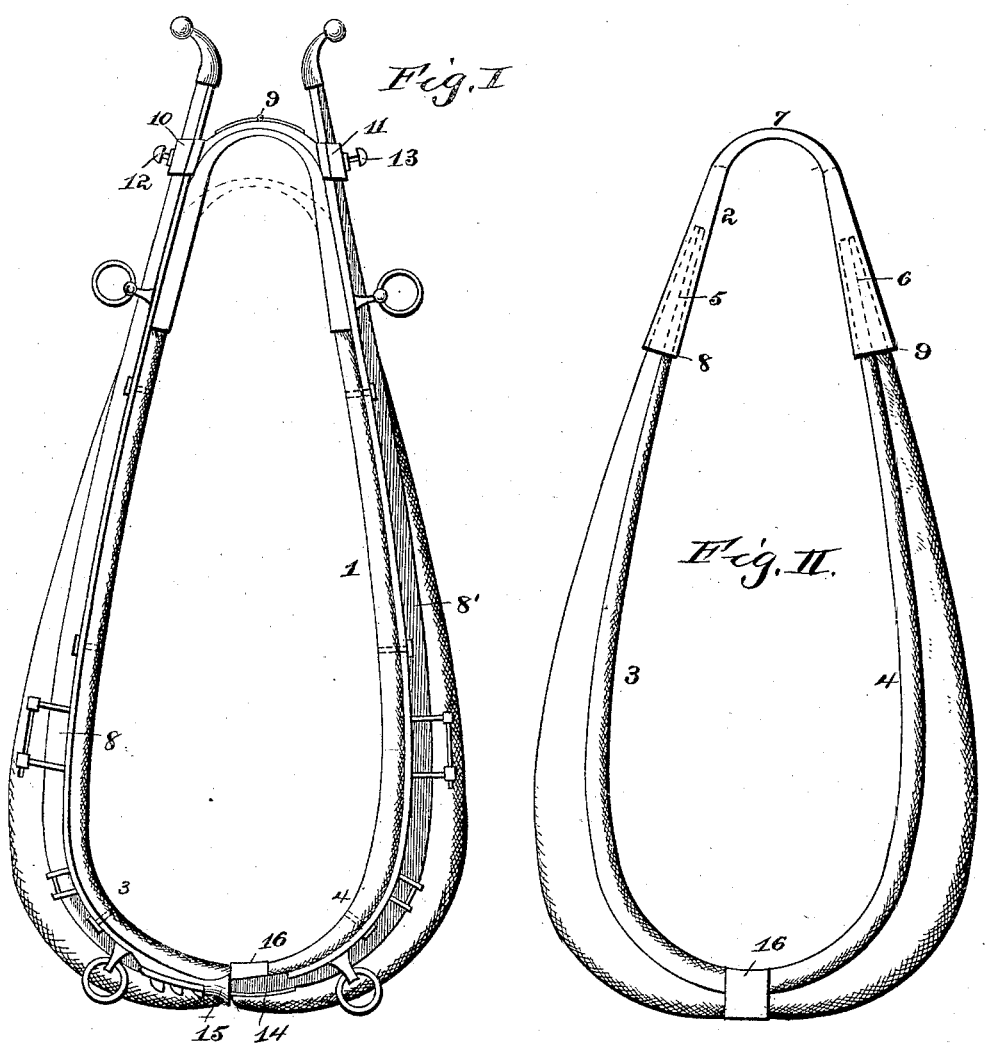
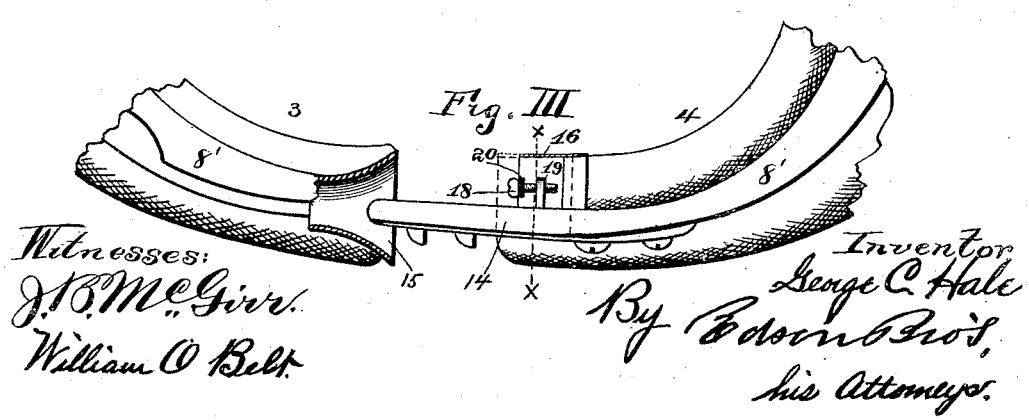

UNITED STATES PATENT OFFICE.

GEORGE C. HALE, OF KANSAS CITY, MISSOURI.

HORSE-COLLAR.

SPECIFICATION forming part of Letters Patent No. 452,928, dated May 26, 1891.

Application filed November 6, 1890. Serial No. 370,478. (No model.)

*To all whom it may concern:*

Be it known that I, GEORGE C. HALE, a citizen of the United States, residing at Kansas City, in the county of Jackson and State of Missouri, have invented certain new and useful Improvements in Horse-Collars; and I do hereby declare the following to be a full, clear, and exact description of the invention, such as will enable others skilled in the art to which it appertains to make and use the same.

In a horse-collar adapted for use in the fire-department service it is essential that the collar shall be capable of adjustment both laterally and vertically to enlarge or contract the same within a minimum time, and also that the collar shall be constructed with a view to securing the greatest possible strength and stability to withstand rough usage and strain and obviate the liability of breakage or damage when running to a fire. The horses in the fire-department service are apt to be injured or disabled, and in the haste attending hitching the horses to the apparatus in responding to an alarm of fire it is sometimes found that another horse other than the regular one has to be used. Hence it is important that the collar should be capable of adjustment to large or small animals within a few moments' time.

It is the object of my present invention to provide an improved collar susceptible of enlargement or contraction both vertically and laterally and to simplify and strengthen the construction consistent with such adjustment of the collar.

With these ends in view my invention comprises a combined collar and hames in which the upper section of the collar is made separate from the two lower sections and connected to such lower sections to be adjusted vertically thereon and form a continuation of the same and means for sustaining the upper section at the desired elevation. This sustaining means, in the preferred embodiment of my invention, consists of a hinged plate connected to the upper adjustable section of the collar and sleeves having the hinged plate fastened to them and fitted on the hames, to which they are fixed by binding-screws. The hinged plate and upper section of the collar are thus adapted for vertical adjustment, and the means which I prefer to employ for coupling the collar and adjusting it laterally consists of a coupling-arm on one section which takes in a fitted mouth on the other section and a cap or sleeve connected to one end of the collar and adjustable thereon toward the other end of the collar to limit the lateral movement of the collar and vary the extent or degree of lateral adjustment. I would have it understood, however, that I do not claim herein the coupling device and the adjustable cap *per se* for the lateral adjustment of the collar, as the same forms the subject-matter of a separate application filed by me on the 21st day of March, 1891, Serial No. 385,851.

My invention further consists of the peculiar construction and arrangement of parts, as will be more fully described, and pointed out in the claims.

To enable others to understand my invention, I have illustrated the same in the accompanying drawings, in which—

Figure I is a front elevation of my invention. Fig. II is an elevation of the collar detached from the hames and showing plainly the operation of the sections, one in the other; and Fig. III is a detail enlarged view of the locking device and means for making the collar wider or narrower.

Referring to the drawings, in which like numerals of reference denote corresponding parts in all the figures, 1 designates the collar, which is composed of the upper section 2 and the lower corresponding sections 3 4. The lower sections 3 4 are made in a manner similar to the corresponding parts on an ordinary collar and have the upper ends 5 6 tapered to a point. The upper section 2 has the narrow curved portion 7 and the hollow downwardly-projecting ends 8 9, in which the upwardly-extending ends 5 6 of the lower sections 3 4 slide and adapt the collar to be made longer or shorter. Securely bolted to the lower sections 3 4 are a pair of hames 8', which are preferably rectangular or triangular in cross-section and are of such length as to permit of the desired adjustment of the upper section of the collar.

To the upper section 2 of the collar is riveted a hinged plate 9, having the sleeves 10 11 on its projecting ends, in which the hames slide, and are held rigidly at the desired height by means of thumb-screws 12 13. By having the plate 9 made in two pieces and hinged together the collar may be opened until the sides are substantially at right angles to each other without danger of breaking or getting out of order, and the sleeves 10 11 are made to correspond in shape to the hames 8 to prevent them from turning on the hames.

The lower end of one of the hames is provided with a spring coupling-arm 14, having projections which lock in the flared mouth 15 on the other hame, as shown and described in my former patent; but to adjust the collar to a thicker neck it is obvious that the lower ends of the sections 3 4 of the collar must be lengthened to contact with each other as well as the hames, and to do this I provide a cap 16, having the slot 17 in its lower side, which conforms to the shape of the lower end of one of the lower sections of the collar and is adapted to slide thereon and be adjusted laterally by means of a thumb-screw 18, which projects inwardly through the front of the cap and works in a threaded aperture in an upwardly-extending lug 19, secured to the lower end 14 of the hame. The thumb-screw 18 is provided with a shoulder 20, which bears against the front of the cap 16 and serves to draw it outward as the screw is turned in one direction, and the head of the screw serves to push the cap inwardly when the screw is turned in the reverse direction.

It sometimes happens that a horse is crippled when going to a fire, and it is then very desirable to have a collar which can be easily and quickly adjusted to another horse having either a larger or smaller neck, and my invention supplies this want.

The length of the collar is changed by simply raising or lowering the upper section 2 and the plate 9 and securing the same in place by the thumb-screws 12 13.

The width of the collar is changed by adjusting the cap 16 on the lower end of the collar by operating the thumb-screw 18 in the proper direction.

I am aware that changes in the form and proportion of parts and details of construction can be made without departing from the spirit or sacrificing the advantages of my invention, and I therefore reserve the right to make such changes as fairly fall within the scope of my invention.

Having thus fully described my invention, what I claim as new, and desire to secure by Letters Patent, is—

1. A horse-collar having the lower sections and the upper section adjustably connected to the lower sections and forming a continuation of the same, in combination with the hames rigidly secured to the lower sections only of the collar, and the hinged plate rigidly attached to the upper section of the collar and adjustably secured on the upper ends of the hames, substantially as shown and described.

2. In an adjustable horse-collar, the telescopical upper section fitted over the lower sections to slide freely thereon, in combination with the hames rigidly secured to the lower sections only of the collar, the sleeves fitted on the hames and having the binding-screws, and the hinged plate attached to the upper section of the collar and rigid with the adjustable sleeves, substantially as and for the purpose described.

In testimony whereof I affix my signature in presence of two witnesses.

GEORGE C. HALE.

Witnesses:
G. T. REED,
T. H. RIDDLE.